(12) United States Patent
Loveless et al.

(10) Patent No.: US 8,011,398 B2
(45) Date of Patent: Sep. 6, 2011

(54) DUST SHROUD FOR GAS POWERED CIRCULAR SAWS

(75) Inventors: Michael Loveless, Price, UT (US); Spencer Loveless, Price, UT (US)

(73) Assignee: Dustless Depot, LLC, Price, UT (US)

( * ) Notice: Subject to any disclaimer, the term of this patent is extended or adjusted under 35 U.S.C. 154(b) by 149 days.

(21) Appl. No.: 12/357,305

(22) Filed: Jan. 21, 2009

(65) Prior Publication Data

US 2009/0183800 A1  Jul. 23, 2009

Related U.S. Application Data

(60) Provisional application No. 61/022,509, filed on Jan. 22, 2008.

(51) Int. Cl.
*B27G 19/00* (2006.01)
*B27G 19/02* (2006.01)

(52) U.S. Cl. .............. 144/251.1; 144/252.1; 83/100; 451/451

(58) Field of Classification Search .......... 144/252.1, 144/252.2, 251.1, 251.2; 83/100; 451/449, 451/451, 453, 456
See application file for complete search history.

(56) References Cited

U.S. PATENT DOCUMENTS

| | | | |
|---|---|---|---|
| RE15,262 E * | 1/1922 | Gurgel | 83/100 |
| 1,643,882 A | 9/1927 | Faiver | |
| 2,478,074 A | 8/1949 | Atkin | |
| 2,819,570 A | 1/1958 | Guilbert et al. | |
| 2,819,571 A | 1/1958 | Morgan | |
| 3,468,076 A | 9/1969 | Jones | |
| 3,673,744 A | 7/1972 | Oimoen | |
| 3,862,521 A | 1/1975 | Isaksson | |
| 3,882,598 A * | 5/1975 | Earle et al. | 30/390 |
| 3,882,644 A | 5/1975 | Cusumano | |
| 4,002,182 A | 1/1977 | Michel | |
| 4,063,478 A * | 12/1977 | Stuy | 83/100 |
| 4,135,334 A | 1/1979 | Rudiger | |
| 4,253,362 A | 3/1981 | Olson | |
| 4,381,628 A | 5/1983 | Dicke | |
| 4,574,532 A | 3/1986 | Haberle et al. | |
| 4,576,072 A | 3/1986 | Terpstra et al. | |
| 4,622,782 A | 11/1986 | Roestenberg | |
| 4,697,389 A | 10/1987 | Romine | |
| 4,782,632 A | 11/1988 | Matechuk | |
| 4,868,949 A | 9/1989 | Loveless et al. | |
| 5,074,044 A | 12/1991 | Duncan et al. | |
| 5,084,972 A | 2/1992 | Waugh | |
| 5,125,190 A | 6/1992 | Buser et al. | |
| 5,167,215 A | 12/1992 | Harding, Jr. | |
| 5,327,649 A | 7/1994 | Skinner | |
| 5,411,433 A | 5/1995 | Keller | |
| 5,440,809 A | 8/1995 | Padilla | |

(Continued)

FOREIGN PATENT DOCUMENTS

GB   2 260 721   4/1993

(Continued)

*Primary Examiner* — Shelley Self
(74) *Attorney, Agent, or Firm* — Bateman IP Law Group

(57) ABSTRACT

A dust shroud for gas powered circular saws allows for mounting to a circular saw and for use therewith out hindering the use of the saw. The shroud does not interfere with the ability to operate the saw or set the saw on the ground, and effectively collects dust and debris without reducing the depth of cut.

18 Claims, 7 Drawing Sheets

U.S. PATENT DOCUMENTS

| | | | |
|---|---|---|---|
| 5,545,082 | A | 8/1996 | Courson et al. |
| 5,564,408 | A | 10/1996 | Bassols |
| 5,566,457 | A | 10/1996 | Batschari et al. |
| 5,575,035 | A | 11/1996 | Reis et al. |
| 5,588,213 | A | 12/1996 | Swanberg |
| 5,609,516 | A | 3/1997 | Courson et al. |
| 5,675,895 | A | 10/1997 | Mori et al. |
| 5,704,956 | A | 1/1998 | Loveless et al. |
| 5,713,785 | A | 2/1998 | Nishio |
| 5,774,992 | A | 7/1998 | Lindenmuth |
| 5,791,979 | A | 8/1998 | Duncan et al. |
| 5,931,072 | A | 8/1999 | Shibata |
| 5,954,863 | A | 9/1999 | Loveless et al. |
| 6,053,674 | A | 4/2000 | Thompson |
| 6,108,912 | A | 8/2000 | Radigan |
| 6,167,626 | B1 | 1/2001 | Doumani et al. |
| 6,219,922 | B1 * | 4/2001 | Campbell et al. ............... 30/124 |
| 6,318,352 | B1 | 11/2001 | Gnazzo et al. |
| 6,347,985 | B1 | 2/2002 | Loveless |
| 6,471,574 | B1 | 10/2002 | Rupprecht et al. |
| 6,557,261 | B1 * | 5/2003 | Buser et al. ................. 30/124 |
| 6,648,742 | B1 * | 11/2003 | Segiel, Jr. .................... 451/451 |
| 6,726,554 | B1 | 4/2004 | Chen et al. |
| 6,748,660 | B2 | 6/2004 | Buser et al. |
| 6,796,208 | B1 | 9/2004 | Jorgensen |
| 6,811,476 | B2 | 11/2004 | Ohlendorf |
| 6,855,040 | B2 | 2/2005 | Huber |
| 6,860,799 | B2 | 3/2005 | Loveless |
| 6,878,050 | B2 | 4/2005 | Wendt et al. |
| 6,902,594 | B2 | 6/2005 | Cho |
| 6,935,939 | B1 | 8/2005 | Buser et al. |
| 7,223,161 | B2 | 5/2007 | Kodani et al. |
| 7,635,293 | B2 * | 12/2009 | Sun et al. ...................... 451/354 |
| 2006/0019585 | A1 | 1/2006 | Zayat |
| 2008/0060631 | A1 * | 3/2008 | Dofher ........................ 125/13.01 |
| 2008/0099053 | A1 | 5/2008 | Loveless |
| 2008/0109986 | A1 | 5/2008 | Loveless |
| 2008/0134518 | A1 * | 6/2008 | Martin ............................. 30/124 |
| 2009/0181604 | A1 | 7/2009 | Loveless |
| 2009/0181605 | A1 | 7/2009 | Loveless |
| 2009/0181606 | A1 | 7/2009 | Loveless |
| 2009/0183377 | A1 * | 7/2009 | Loveless et al. ............... 30/390 |
| 2009/0183800 | A1 | 7/2009 | Loveless |
| 2009/0186559 | A1 | 7/2009 | Loveless |
| 2009/0311953 | A1 | 12/2009 | Maute et al. |

FOREIGN PATENT DOCUMENTS

| | | |
|---|---|---|
| JP | 10-000559 | 1/1998 |
| KR | 10-2002-0056086 | 7/2002 |

* cited by examiner

DUST SHROUD FOR GAS POWERED CIRCULAR SAWS

RELATED APPLICATIONS

The present application claims the benefit of U.S. Provisional Application Ser. No. 61/022,509, filed Jan. 22, 2008, which is expressly incorporated herein in its entirety.

BACKGROUND OF THE INVENTION

1. The Field of the Invention

The present invention relates to dust shrouds. More specifically, the present invention relates to a dust shroud for gas powered circular saws.

2. State of the Art

Dust shrouds are desirable for multiple reasons, such as minimizing the cleanup necessary as well as limiting exposure to hazardous dust. It is particularly desirable to collect certain types of dust, such as dust from cutting cement or stone, as these types of dust present a greater health hazard. Gas powered circular saws are commonly used for cutting cement or other tasks. Without a dust shroud, dust and debris are scattered over a wide area. It is desirable to contain the dust which is created for several reasons. It is desirable to contain the dust and debris to keep the workplace cleaner and to minimize the time necessary to clean up afterwards. Fine dust is often created which can be quite difficult to clean up afterwards. It is also desirable to contain the dust and debris to keep the same from getting into the tool itself, causing premature failure of the bearings, motor, etc. Additionally, debris such as concrete dust poses a health risk to the machine operator and others who may breathe it. It is desirable to collect the dust to minimize any exposure.

One difficulty in providing dust shrouds is the fact that the shroud must fit each particular tool without impeding the operation of the tool while still effectively collecting dust. Gas powered circular saws are often used for cutting concrete as they have a significant amount of power and can use a large diameter cutting blade. It is desirable to provide a dust shroud which does not reduce the depth of cut by obscuring too much of the blade, but that still effectively collects the dust. Additionally, gas powered saws are typically set on the ground after use. The dust shroud should not interfere with the normal feet or contact points between the saw and the ground, as such may make the saw unstable or make the dust shroud prone to premature failure. Thus, it has been particularly difficult to fit a dust shroud to gas powered circular saws since they are very compactly constructed, and since the dust shroud can not protrude from the saw so as to not interfere with the operation of the saw. The dust shroud must not interfere with the blade and the available depth of cut but must effectively capture the dust and debris which is generated.

There is thus a need for a dust shroud for gas powered circular saws which is effective and which does not interfere with the use of the saw.

SUMMARY OF THE INVENTION

It is an object of the present invention to provide an improved dust shroud for gas powered circular saws.

According to one aspect of the present invention, a dust shroud is provided which may be used with a gas powered circular saw without reducing the depth of cut. A dust shroud design is presented which only minimally covers the blade but which still effectively captures the dust and debris which is generated.

According to another aspect of the invention, a dust shroud is provided which may be used with a gas powered circular saw without interfering with the use of the saw, and without interfering with the built in feet or points of contact between the saw and the ground. A dust shroud design is provided which does not protrude from the saw in a manner which makes the saw unwieldy or which otherwise interferes with the operation of the saw. The dust shroud design, however, retains air passages which are adequately sized and properly shaped to maintain proper air flow and effectively collect dust and debris.

These and other aspects of the present invention are realized in a dust shield as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIGURE, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
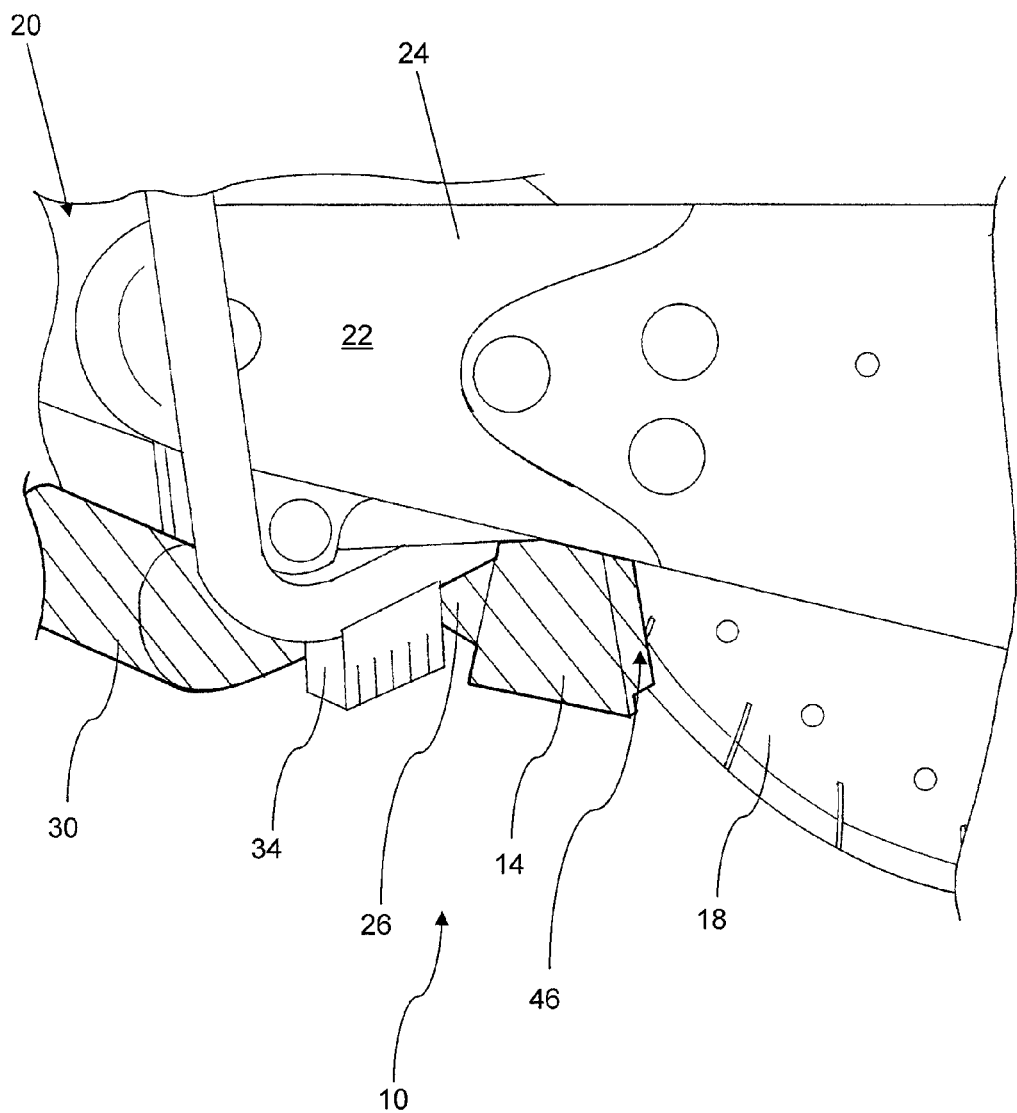
FIG. 1 shows a perspective view of a dust shroud according to the present invention mounted to a gas powered circular saw.

Turning now to FIG. 1, a perspective view of a dust shroud 10 according to the present invention which is mounted to a gas powered circular saw 22 is shown. Gas powered circular saws 22 are typically constructed in a manner similar to a chain saw. The engine 20 and frame are similar to a chain saw, and the cutting bar and cutting chain are replaced with a support bar 24, blade axle, and drive chain. As such, the gas powered circular saw is quite compact and creates a considerable challenge in forming a dust shroud which effectively collects dust without adversely affecting the use of the saw. The dust shroud 10 includes a front dust collection chamber 14 which extends around the rear portion of a saw blade 18 of a gas powered circular saw 22. The dust collection chamber 14 is pneumatically connected to an air passage 26 and thereby to a vacuum port 30. The vacuum port 30 is connected to a vacuum to draw dust and debris from around the blade 18, through the chamber 14, through the passage 26, through the vacuum port 30, and into the vacuum. The passage 26 passes between the feet 34 of the saw 22. It is appreciated that there is very little room for a dust shroud, making it difficult to use the same on a gas powered circular saw. The dust shroud should not protrude below the bottom most point of the saw frame (such as the feet 34) while the saw is in use or in rest, as this would cause the dust shroud 10 to contact the ground or work piece and may cause damage to the shroud.

Figure 2:
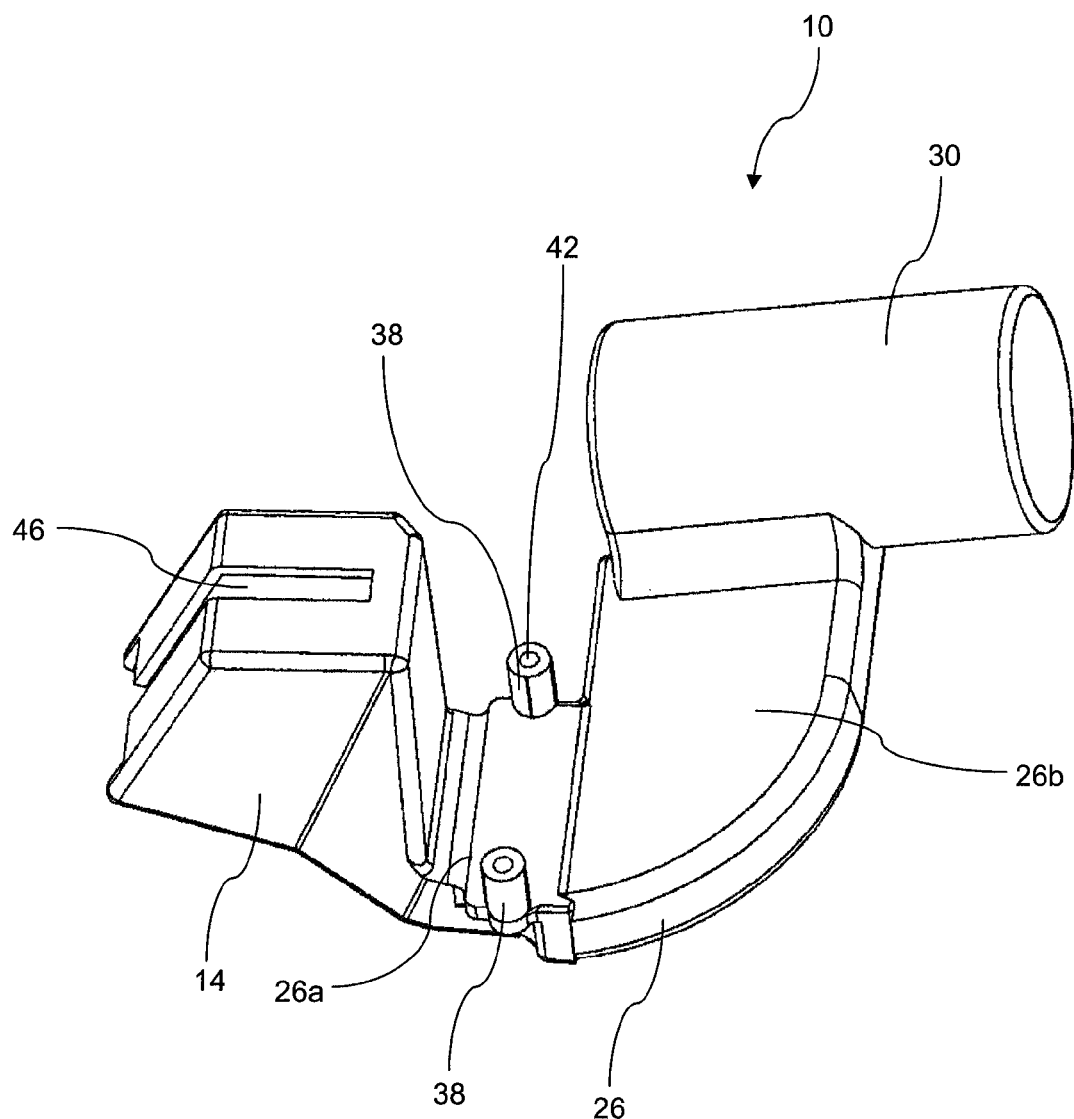
FIG. 2 shows a top perspective view of the dust shroud of FIG. 1.

Turning now to FIG. 2, a top perspective view of the dust shroud of FIG. 1 is shown. It can be better seen how the passage 26 includes a relatively straight portion 26a which passes between the feet 34 of the saw 22 and a curved portion 26b which extends towards the side of the saw so as to accommodate the vacuum port 30. Mounting studs 38 with holes 42 may be provided to attach the shroud 10 to a saw. The dust collection chamber 14 is formed to fit around the blade, and has a slot 46 formed therethrough. As seen in FIG. 1, the blade passes through the slot 46 so that the chamber 14 extends around both sides of the blade.

Figure 3:
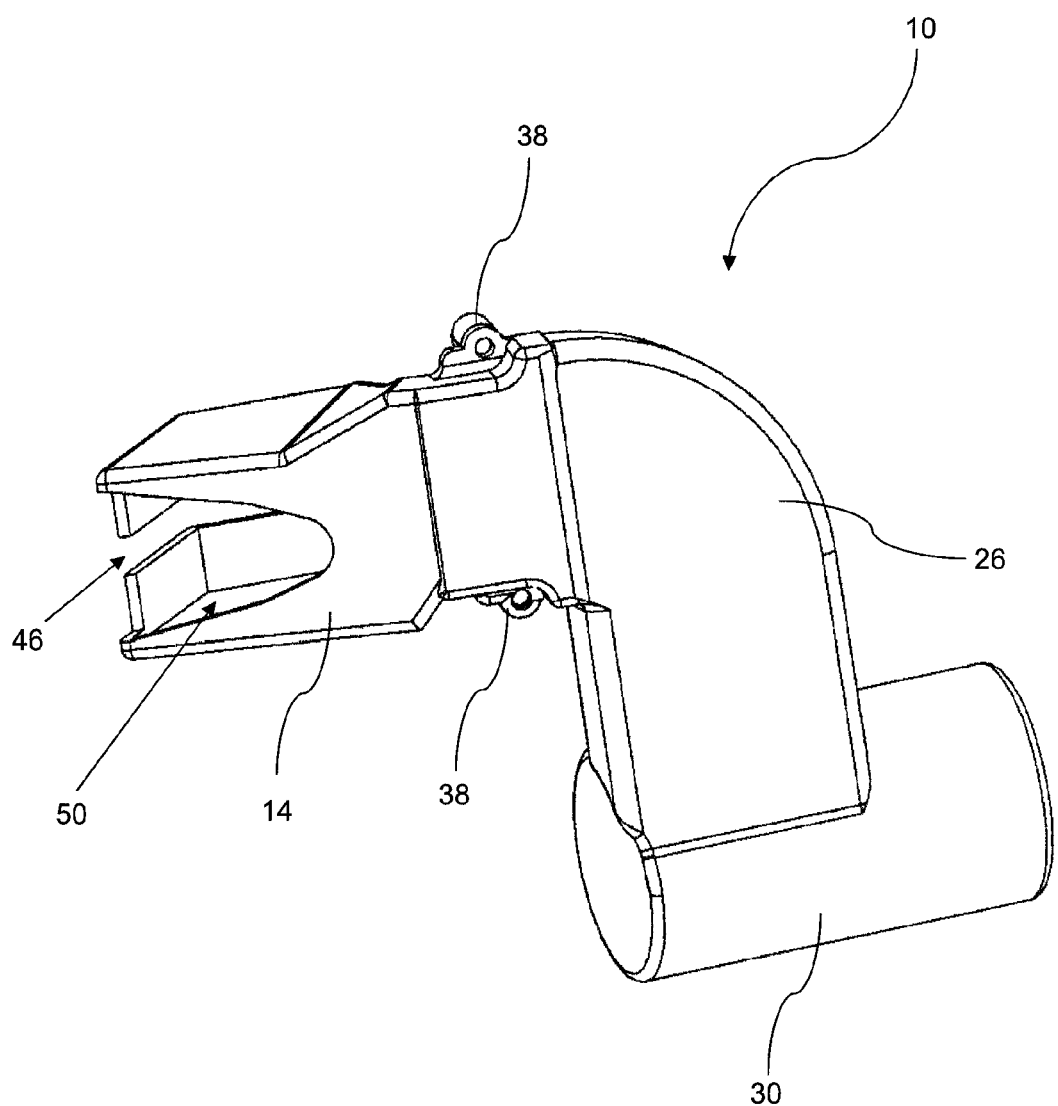
FIG. 3 shows a bottom perspective view of the shroud of FIG. 1.

Turning now to FIG. 3, a bottom perspective view of the shroud of FIG. 1 is shown. It can be better seen how the dust collection chamber 14 has an enlarged opening 50 on the bottom thereof to allow the dust and debris easy entry into the chamber. The enlarged opening 50 is larger at the front of the chamber 14 and tapers to a smaller width at the back of the opening 50. The slot 46 is narrower, keeping the front and top sides of the chamber 14 closer to the blade 18. The enlarged opening 50 on the bottom of the dust collection chamber 14 makes the majority of the air flow into the chamber from the bottom while the more narrow slot 46 in the top and front of the chamber 14 keeps the debris from exiting the chamber, causing the dust shroud 10 to collect a majority of the debris and dust which is generated. For improved performance, the enlarged opening 50 may extend slightly into the lower portion of the front of the dust collection chamber 14 (as is visible in FIG. 4) to ensure that the dust and debris carried by the saw teeth are drawn into the chamber.

Figure 4:
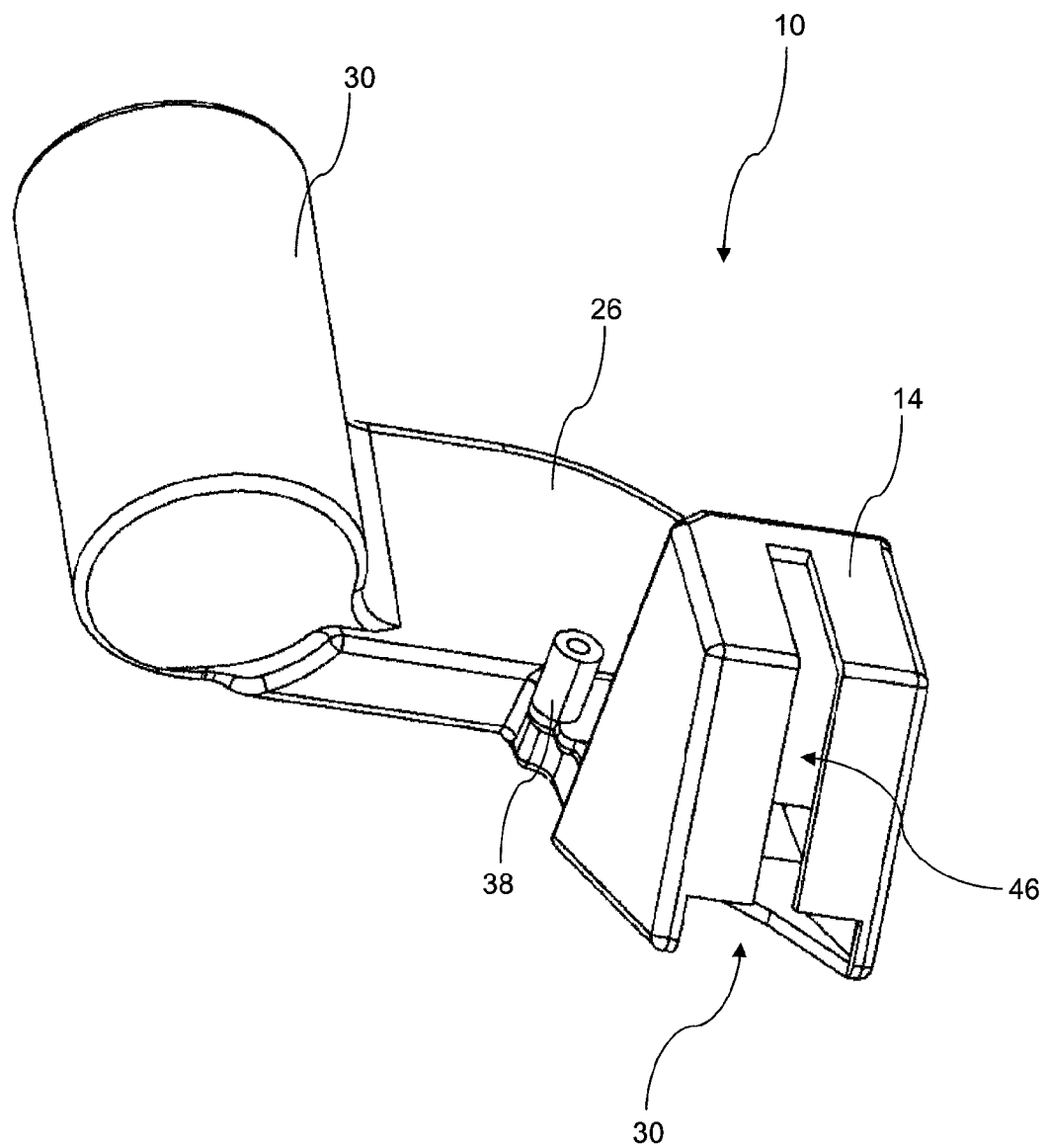
FIG. 4 shows a front perspective view of the shroud of FIG. 1.

Turning now to FIG. 4, a front perspective view of the shroud of FIG. 1 is shown. FIG. 4 illustrates how the bottom opening 50 of the dust collection chamber 14 is larger than the slot 46. The opening 50 results in most of the bottom of the dust collection chamber 14 being open. The slot 46 extends around most of the top and front of the dust collection chamber 14, causing the dust collection chamber to extend more completely around the blade. It can be observed how the dust shroud 10 includes a dust collection chamber which envelops a portion of the blade, an air passage extending rearwardly from the dust collection chamber and which then turns about 90 degrees laterally, and a vacuum port connected to the air passage at an angle of about 90 degrees.

Figure 5:
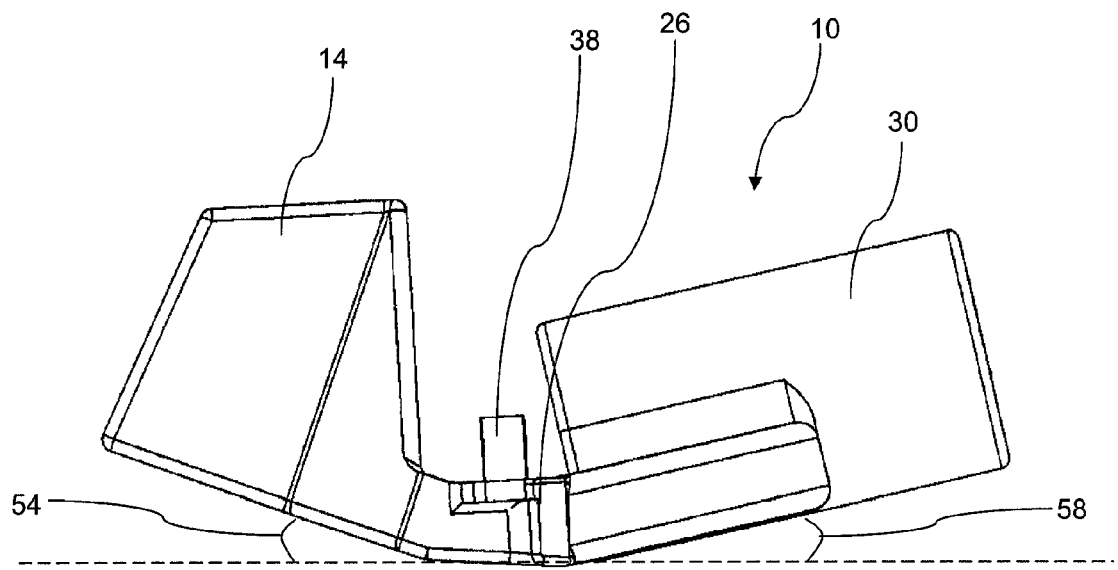
FIG. 5 shows a side view of the shroud of FIG. 1.

Turning now to FIG. 5 a side view of the shroud of FIG. 1 is shown. It can be seen how the dust collection chamber 14 is angled upwardly from horizontal as indicated at 54. This helps to keep the dust collection chamber 14 from interfering with the available depth of cut of the saw 22. Additionally, the passage 26 and vacuum port 30 are angled upwardly from horizontal as indicated at 58 to keep these from hitting the ground when the saw 22 is set down after use. This prevents damage to the shroud 10 and allows for unimpeded use of the saw 22. Thus, the bottom of the dust collection chamber 14 and the bottom of the air passage 26 and vacuum port 30 are disposed at an acute angle relative to each other, resulting in a design which does not interfere with the use of the saw and which does not interfere with resting the saw on the ground using the factory designed feet of the saw. The dust shroud passes underneath the body of the saw without interfering with the use of the saw.

Figure 6:
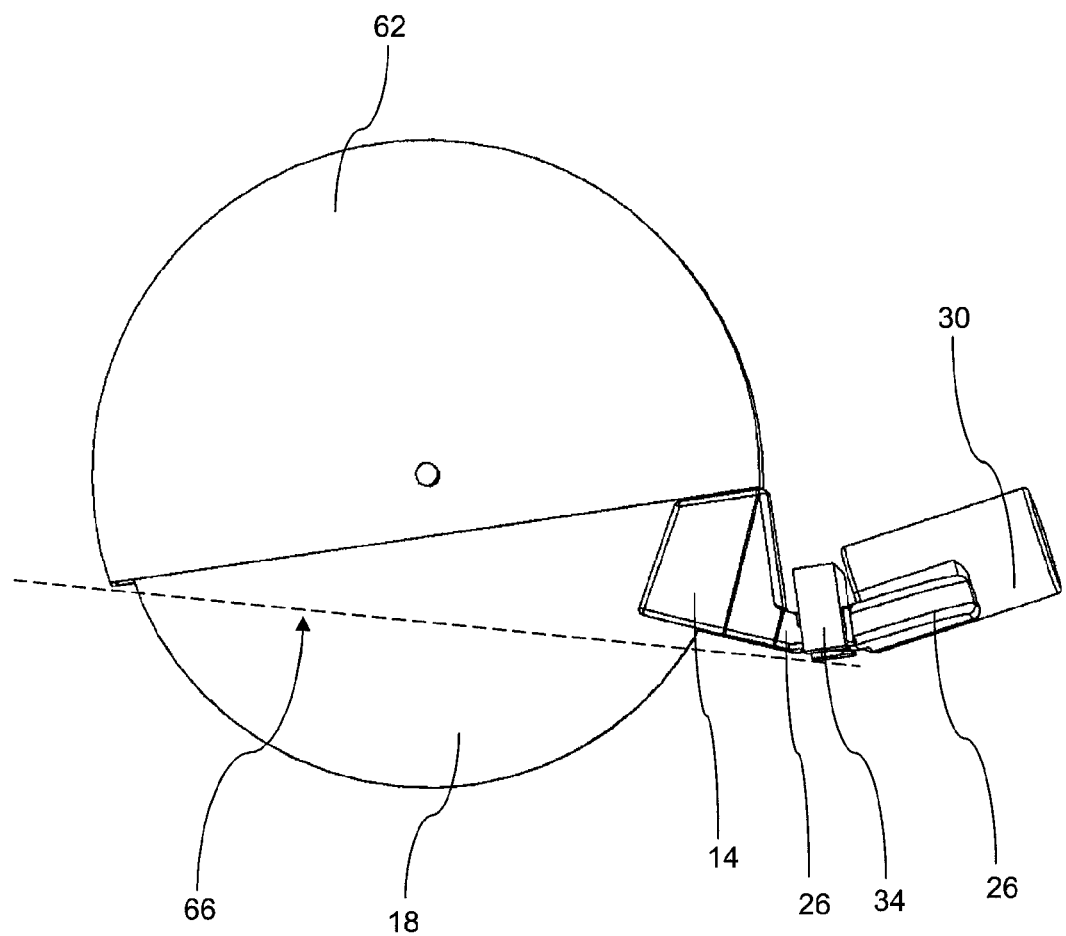
FIG. 6 shows a side view of the shroud of FIG. 1 as well as portions of a gas powered circular saw.

Turning now to FIG. 6, a side view of the shroud of FIG. 1 as well as portions of a gas powered circular saw are shown. The blade 18, feet 34, and blade guard 62 of the saw 22 are shown. It can be seen how the dust collection chamber 14 extends around the cutting edge of the saw blade 18 at the point of dust generation (as the saw is down cutting) without interfering with the maximum depth of cut as indicated by line 66. The maximum depth of cut 66 is thus limited by the positions of the blade guard 62 and the feet 34. The dust collection chamber fits against the blade guard, reducing the amount of dust and debris which is not captured by the dust shroud. The compact size of the chamber 14, opening 50 and slot 46, along with the angle 54 formed by the base of the chamber allow for efficient dust collection without interfering with the depth of cut.

Figure 7:
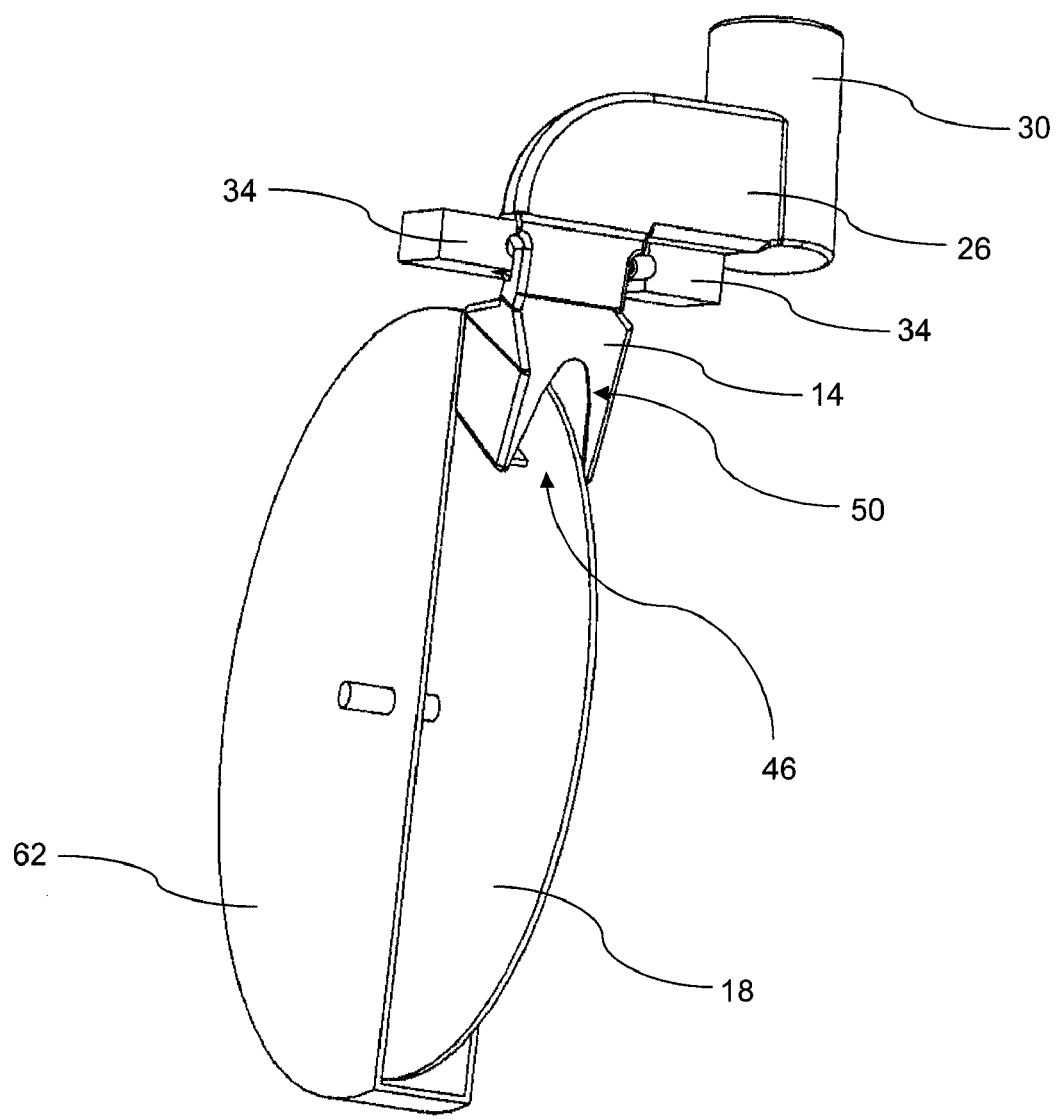
FIG. 7 shows a bottom perspective view of the shroud of FIG. 1 and the circular saw portions of FIG. 5.

Turning now to FIG. 7, a bottom perspective view of the shroud of FIG. 1 and the circular saw portions of FIG. 5 is shown. It can be seen how the passage 26 fits between the saw feet 34 so as to not interfere with the use of the saw 22 or with setting the saw on the ground. It can also be seen how the chamber 14 extends around the blade 18. The blade 18 extends back into the opening 50 so that the teeth (typically diamond abrasive coated) pass through the opening 50. The shroud 10 causes a majority of the dust and debris to enter the dust collection chamber 14 and removes the same through the vacuum port 30. The slot 46 keeps debris from leaving the chamber 14 without being collected. The dust shroud is particularly advantageous as it presents a compact shape which is effective in collecting a majority of the dust produced while using the saw 22 without interfering with the use of the saw.

There is thus disclosed an improved dust shroud for use with gas powered circular saws. It will be appreciated that numerous changes may be made to the present invention without departing from the scope of the claims.

What is claimed is:

1. A dust shroud for a gas powered circular saw comprising:
   a dust collection chamber configured to receive the blade of a gas powered circular saw through a slot formed therein such that the dust collection chamber extends around both sides of the saw blade;
   a dust collection passage disposed in fluid communication with the chamber and extending away from the chamber so as to extend below the circular saw; and
   a vacuum port disposed in fluid communication with the passage such that a vacuum disposed in the vacuum port can extract dust from the dust collection chamber; and
   wherein the dust collection passage comprises a first section which is connected to the dust collection chamber and which extends rearwardly from the dust collection chamber beneath the circular saw, a second section which is connected to the first section and which curves so as to extend laterally from the side of the saw, and wherein the vacuum port is connected to the second section at an angle such that the vacuum port faces rearwardly relative to the saw and is laterally offset relative to the dust collection chamber.

2. A dust shroud for gas powered circular saws comprising:
   a dust collection chamber configured to receive the blade of a gas powered circular saw through a slot formed therein such that the dust collection chamber extends around both sides of the saw blade;

a passage disposed in fluid communication with the chamber and extending away from the chamber so as to extend below a circular saw; and a vacuum port disposed in fluid communication with the passage such that a vacuum disposed in the vacuum port can extract dust from the chamber, and wherein the dust collection chamber is generally enclosed, and wherein a top surface thereof has a slot formed therethrough, a front surface thereof has a slot formed therethrough and connecting to the slot formed through the top surface, and a bottom surface thereof has an enlarged opening formed therethrough and connecting to the slot formed through the front surface.

3. The dust shroud of claim 2, wherein the bottom surface of the dust collection chamber is substantially open, and wherein the front surface and top surface are closed except for the slots formed therethrough.

4. The dust shroud of claim 2, wherein a bottom portion of the front surface is open to a width corresponding to the width of the enlarged opening in the bottom surface.

5. The dust shroud of claim 1, wherein the passage has a cross section which is narrow in a vertical direction and elongate in a horizontal direction.

6. The dust shroud of claim 1, wherein the circular saw has feet extending downwardly from the bottom thereof, and wherein the dust collection passage passes between the feet.

7. The dust shroud of claim 2, wherein the dust collection passage comprises a first section which is connected to the dust collection chamber and which extends rearwardly from the dust collection chamber beneath the circular saw, a second section which is connected to the first section and which curves so as to extend laterally from the side of the saw, and wherein the vacuum port is connected to the second section at an angle such that the vacuum port faces rearwardly relative to the saw and is laterally offset relative to the dust collection chamber.

8. A dust shroud for a gas powered circular saw comprising:
   a dust collection chamber configured to receive the blade of a gas powered circular saw through a slot formed therein such that the dust collection chamber extends around both sides of the saw blade;
   a dust collection passage disposed in fluid communication with the chamber and extending away from the chamber so as to extend below the circular saw; and
   a vacuum port disposed in fluid communication with the passage such that a vacuum disposed in the vacuum port can extract dust from the dust collection chamber; and
   wherein the dust collection chamber has a bottom face and the dust collection passage has a bottom face, and wherein, from a location between the dust collection chamber and dust collection passage, the bottom face of the dust collection chamber is sloped upwardly and the bottom face of the dust collection passage is sloped upwardly and wherein the bottom face of the dust collection chamber and the bottom face of the dust collection passage are disposed at an acute angle relative to each other.

9. The dust shroud of claim 1, wherein the dust shroud is attached the bottom of a saw, the dust collection passage and the vacuum port extend upwardly and towards the back of the saw, and a bottom face of the dust collection chamber extends upwardly and towards the front of the saw.

10. The dust shroud of claim 1, wherein installation of the dust shroud on the gas powered circular saw places the dust collection chamber so as to extend around an edge, a first side, and a second side of a portion of the blade so as to generally enclose said portion of the blade, position the dust collection passage beneath the saw, position a front portion of the dust collection passage so as to pass between feet disposed on the bottom of the circular saw, position a rear portion of the dust collection passage so as to curve towards a side of the saw and extend laterally thereto, and position the vacuum port so as to extend longitudinally towards the back of the saw along the side of the saw.

11. A dust shroud for a gas powered circular saw, the dust shroud comprising:
   a generally enclosed dust collection chamber, the dust collection chamber having a continuous slot formed through a front surface and a top surface thereof and an opening which is wider than the slot formed in a lower surface thereof, the opening being continuous with the slot, the dust collection chamber receiving a circular saw blade through the opening and slot formed therethrough so as to generally enclose an edge and sides of a portion of the blade and such that the edge passes through said opening;
   a dust collection passage pneumatically connected to the dust collection chamber and extending rearwardly therefrom beneath the saw, the dust collection passage having a reduced vertical height and an extended horizontal width, the dust collection passage curving laterally so as to extend towards the side of the circular saw; and
   a vacuum port pneumatically connected to the dust collection passage and connectable to a vacuum hose so as to draw air from the dust collection chamber, through the air passage, and through the vacuum port.

12. The dust shroud of claim 11, wherein the vacuum port extends rearwardly along the side of the saw.

13. The dust shroud of claim 11, wherein the bottom of the vacuum port is generally coplanar with the bottom of the air passage and disposed at an acute angle relative to the bottom of the dust collection chamber.

14. The dust shroud of claim 11, wherein the circular saw has feet extending downwardly from the bottom thereof, and wherein the dust collection passage passes between the feet and extends laterally to the side of the bottom of the saw.

15. The dust shroud of claim 14, wherein the lower surface of the dust collection chamber extends forwards and upwards from the feet towards the middle of the saw blade and wherein the dust collection passage extends rearwards and upwards along the bottom of the saw.

16. A dust shroud for a circular saw comprising:
   a circular saw, the saw comprising:
      a circular blade;
   the dust shroud comprising:
   a generally enclosed dust collection chamber, the dust collection chamber having an opening formed in the bottom thereof and a slot formed through the front and top thereof, the slot being connected to the opening, the slot and opening receiving the blade so as to enclose a portion of an edge and sides of the blade;
   an dust collection passage disposed in pneumatic communication with the dust collection chamber, the passage extending rearwardly from the dust collection chamber underneath the saw and curving laterally so as to extend to the side of the saw; and a vacuum port disposed in pneumatic communication with the air passage, the vacuum port being displaced laterally from the dust collection chamber and extending rearwardly along the side of the saw.

17. The dust shroud of claim 16, wherein the bottom of the dust collection chamber angles upwardly from the back thereof and wherein a bottom surface of the dust collection passage angles upwardly from the front thereof.

18. The dust shroud of claim 16, wherein the saw has feet attached to the bottom thereof, and wherein the dust collection passage passes between the feet and extends along the bottom of the saw.

* * * * *